TAPE GUIDE APPARATUS FOR HELICAL SCAN RECORDERS

Filed Oct. 28, 1965 Sheet 1 of 2

Inventor
Nobutoshi Kihara

Inventor
Nobutoshi Kihara

United States Patent Office 3,435,154
Patented Mar. 25, 1969

3,435,154
TAPE GUIDE APPARATUS FOR HELICAL SCAN RECORDERS

Nobutoshi Kihara, Tokyo, Japan, assignor to Sony Corporation, Tokyo, Japan, a corporation of Japan Filed Oct. 28, 1965, Ser. No. 505,518
Claims priority, application Japan, Oct. 31, 1964, 39/85,136
Int. Cl. G11b 5/00
U.S. Cl. 179—100.2 5 Claims

ABSTRACT OF THE DISCLOSURE

Tape guide apparatus including a plurality of coaxial, cylindrical tape guide members, a supporting member for said tape guide members and comprising a plurality of spaced, stopper means extending axially therefrom, and means for attaching said tape guide members to said supporting member with the former in abutment with said stopper means to maintain said tape guide members in coaxial alignment.

This invention relates to a magnetic tape guide apparatus and more particularly to a magnetic tape guide apparatus for use with a rotary head.

In magnetic video tape recorders presently on the market one or more rotary magnetic heads are used to record signals on a magnetic tape and to reproduce signals recorded on the tape. In one form of video tape recorder two or more cylindrical guide members are disposed coaxially in relation to the rotary magnetic head and a magnetic tape is transported obliquely along the peripheral surfaces of the guide members, the guide members serving to both support and guide the magnetic tape. A rotary magnetic head is positioned in the gap between the guide members. The rotary magnetic head is rotated at a high speed and as the magnetic tape is drawn over the gap formed by the cylindrical guide members the magnetic head scans the tape and forms thereon skewed magnetic tracks.

In order for a video tape recorder to function properly it is necessary that the guide members be disposed in axial alignment. It is also important that the planar surfaces of the guide members be parallel to the planar surfaces on the other guide member. In prior art tape recorders this alignment of the rotary head assembly has created numerous difficulties particularly when the head had to be replaced. The problem of alignment has also created numerous problems in maintaining and inspecting the video tape recorder, since it has often happened that in the process of maintenance the head is shifted so that it is no longer in proper alignment.

In view of the foregoing it is the primary object of the present invention to provide a tape guide apparatus for use in a magnetic video tape recorder which provides for automatic alignment during installation.

Another object of the present invention is to provide a magnetic tape guide apparatus for use with a rotary head which is simple in construction and reliable in operation and which may be easily replaced without affecting its alignment.

Yet another object of the present invention is to provide a magnetic tape guide apparatus for use with a rotary magnetic head which can be easily and quickly installed in a video tape recorder in such manner that the guide members are in axial alignment and in which the planar surfaces of the guide members are parallel.

These and further objects, features and advantages of the present invention will appear from a reading of the following detailed description of one embodiment of the invention, which is to be read in conjunction with the accompanying drawings wherein like components in the several views are identified by the same reference numerals.

Figure 1:
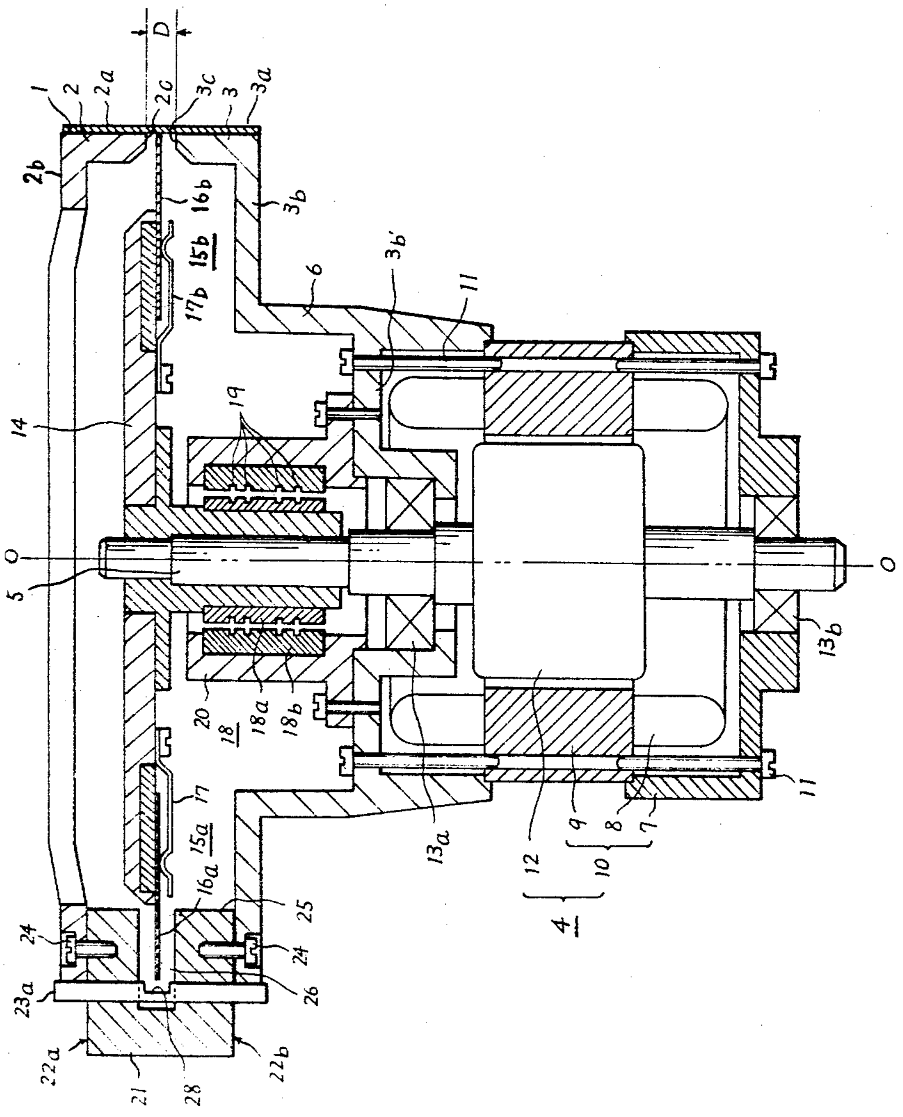
FIGURE 1 is a cross-sectional view of a tape guide apparatus in accordance with the present invention.
Figure 2:
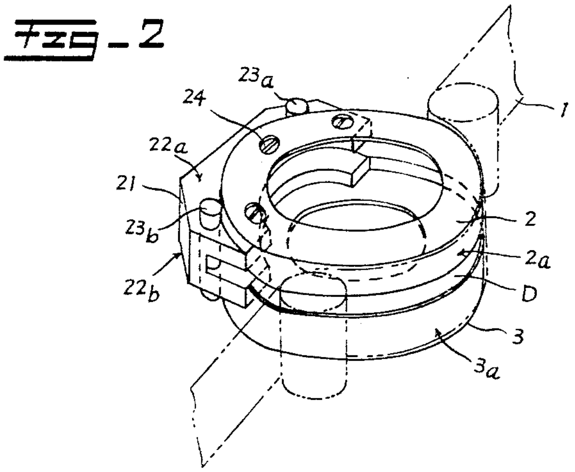
FIGURE 2 is a perspective view of one portion of the apparatus illustrated in FIGURE 1, and illustrating the cylindrical guide members of the present invention and the apparatus for maintaining these guide members in axial alignment and with their planar surfaces in a parallel relationship.
Figure 3A:
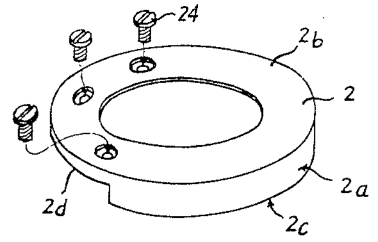
FIGURE 3 is an exploded view in perspective of the components illustrated in FIGURE 2, FIGURE 3A illustrating the upper guide member, FIGURE 3B illustrating a supporting member and FIGURE 3C illustrating the lower guide member.
Figure 3B:
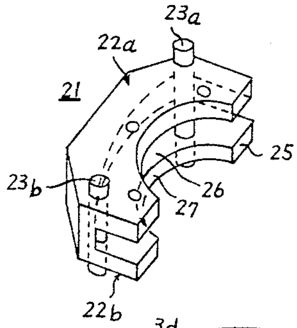
Figure 3C:
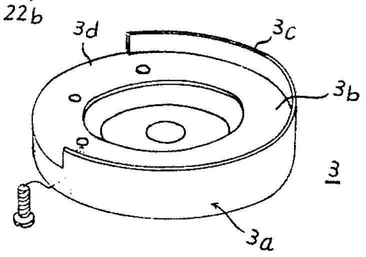

Referring now to the figures and particularly to FIGURE 1, there is illustrated a portion of a video tape recorder which includes a rotary magnetic head, the means for rotating the head and two cylindrical guide members for supporting and guiding the tape so that the tape is scanned by the rotary magnetic head. The magnetic tape is identified in general by the numeral 1 while the upper and lower cylindrical guide drums are identified by the reference numerals 2 and 3 respectively. The guide drums 2 and 3 as illustrated in FIGURE 1 are disposed in axial alignment on the axis O—O and are spaced apart from each other a fixed distance D. The magnetic tape 1 contacts the peripheral surfaces 2A and 3A of the guide drums 2 and 3, the peripheral surfaces 2A and 3A forming the support and guiding surfaces for the magnetic tape 1. The top portion of upper guide drum 2 and the bottom portion of lower guide drum 3 are provided with planar surfaces identified respectively by the numerals 2B and 3B. As illustrated in FIGURES 2 and 3 the central portions of the guide drums 2 and 3 are removed for a purpose to be presently described.

The rotary magnetic head is rotated by a motor which is designated in general by the numeral 4. As illustrated in FIGURE 2 the motor 4 is mounted on the lower cylindrical guide drum 3 in such manner that the rotary shaft 5 of the motor 4 is coaxial with the cylindrical guide drums 2 and 3. In order to support the motor 4 the lower cylindrical guide drum 3 is formed with a projecting cylindrical skirt 6. The skirt 6 is coaxial with the guide drum 3 and the motor 4 is attached to a bracket 3B′ extending between the inner surface of the skirt 6 and parallel to the bottom surface 3B of the lower guide drum 3. The motor 4 is attached to the bracket 3B′ by means of bolts 11, which extend between the bracket 3B′ and a motor cover 7.

The motor 4 consists of a motor 12 and a stationary part which includes a coil 8 and a yoke 9. The rotary shaft 5 of the motor 4 is supported by bearings identified by the numerals 13A and 13B. As illustrated in FIGURE 1 the upper end of the shaft 5 extends within the hollowed-out portions of the upper and lower guide drums 2 and 3 and has mounted thereon a rotary arm 14. Each end of the rotary arm 14 has mounted thereon a magnetic head designated respectively by the numerals 15A and 15B. These magnetic heads 15A and 15B may be of any well-known construction such as used conventionally in magnetic video tape recorders. The head tips are identified respectively by the numeral 16A and 16B and are mounted on the heads 15A and 15B in such a manner as to slightly project beyond the periphery 2A and 3A of the cylindrical guide drums 2 and 3, and through the gap D separating the cylindrical guide drums 2 and 3.

The rotary transformer 18 functions to convey signals reproduced by the magnetic heads 15A and 15B from the magnetic tape 1 or to convey signals to the magnetic head 15A and 15B for recording on the magnetic tape 1. The reference numerals 18A and 18B represent respectively stationary and rotary parts of the rotary transformer 18, while the reference numeral 19 designates conductive rings. The stationary part 18B of the rotary transformer 18 is supported by a frame 20A while the rotary part 18A of the rotary transformer 18 is mounted on a boss 20B attached to the shaft 5 of the motor 4.

As previously described, in order for a video tape recorder to faithfully record and reproduce signals it is important that the upper and lower cylindrical guide drums 2 and 3 be positioned in exact coaxial alignment with each other and that the planar surfaces 2B and 3B of the cylindrical guide drums 2 and 3 be exactly parallel. If this is not done it has a detrimental effect on the operation of the video tape recorder.

In accordance with the present invention the centering or positioning of the cylindrical guide drums 2 and 3 is accomplished by utilizing the peripheral surfaces 2A and 3A of the guide drums 2 and 3. In order to accomplish this a supporting member 21 as best illustrated in FIGURE 3B is provided to which are attached the cylindrical guide drums 2 and 3. The supporting member 21 is provided with upper and lower planar surfaces 22A and 22B which are parallel to each other. A pair of projections or stopper means 23A and 23B project from the planar surfaces 22A and 22B. It is important to note that the projections 23A and 23B must be disposed at right angles to the planar surfaces 22A and 22B. The purpose of maintaining the projections 23A and 23B perpendicular to the planar surfaces 22A and 22B is to maintain the axis of the projections 23A and 23B in exact parallel alignment.

The cylindrical guide drums 2 and 3 are mounted on and attached to the supporting member 21 by means of bolts 24. The guide drums 2 and 3 are mounted on the supporting member 21 in such a manner that the top 2B and bottom 3B planar surfaces of the guide drums 2 and 3 engage respectively the upper 22A and lower 22B planar surfaces of the supporting member 21. In addition, the peripheral surfaces 2A and 3A of the guide drums 2 and 3 are maintained in contact with the projections 23A and 23B. The area between the planar surfaces 22A and 22B of the supporting member 21 is grooved or recessed as indicated by the numeral 26 in order to permit free rotation of the magnetic heads 15A and 15B. The supporting member 21 if desired may be formed with an arcuate recessed portion 27 in the side 25 of the supporting member 21.

When the guide drums 2 and 3 are mounted on and affixed to the supporting member 21 in the manner described and illustrated, the guide drums 2 and 3 are exactly coaxial with each other and consequently are coaxial with the rotary shaft 5 of the motor 4 as illustrated in FIGURE 1. In addition, the upper surface 2B of the guide drum 2 and the lower surface 3B of the lower guide drum 3 are parallel to each other. Due to this axial and parallel alignment the magnetic head tips 16A and 16B can be easily adjusted to project a constant distance from the peripheral surfaces 2A and 3A of the cylindrical guide drums 2 and 3 over the entire rotary angular range of the magnetic heads. In addition, the gap D between the guide drums 2 and 3 can be maintained at a constant width since the planar surfaces 2B and 3B of the rotary drums 2 and 3 are parallel to each other. In essence the supporting member 21 serves as a spacer between the rotary drums 2 and 3 and determines the width of the gap D. With apparatus such as that described and illustrated the entire head assembly can be easily replaced, maintained or inspected without affecting the alignment of the entire mechanism. In addition, the apparatus of this invention permits the rapid and easy assembly of the drums 2 and 3 in such manner that they are absolutely coaxial.

It is to be understood that while this invention has been described with reference to apparatus employing two cylindrical guide drums the invention is applicable as well to apparatus having three or more cylindrical guide drums which are disposed coaxially. In addition, although the present invention has been described with reference to a magnetic tape guide apparatus for use with a magnetic video tape recorder it is to be understood that this invention is applicable to various other types of tape guide apparatus. It will accordingly be apparent that many modifications and variations of the present invention may be effected without departing from the scope of the invention, except as limited by the appended claims.

What is claimed and desired to be secured by Letters Patent is:

1. A tape guide apparatus for guiding and supporting a moving tape wherein the tape guiding and supporting members are mounted coaxially and in parallel planes, said apparatus comprising a plurality of cylindrical tape guide members having top and bottom flat surfaces which are in parallel planes, a supporting member for said tape guide members, said supporting member having a plurality of flat surfaces in parallel spaced planes, a plurality of stopper means extending from said supporting member and presenting abutment surfaces which are perpendicular to said flat parallel surfaces of said supporting member and spaced equally from the desired axis of said tape guide members, and means for attaching said tape guide members to said supporting member with said tape guide members abutting at their peripheries against said abutment surfaces of said stopper means and said flat parallel surfaces of said tape guide members contacting said flat parallel surfaces of said supporting member whereby said tape guide members are maintained in coaxial alignment and in parallel planes.

2. A tape guide apparatus for guiding and supporting a moving tape wherein the tape guiding and supporting members are mounted coaxially and in parallel planes, said apparatus comprising a plurality of cylindrical tape guide members, each of said tape guide members having top and bottom flat surfaces which are in parallel planes, a supporting member for said tape guide members, said supporting member having a plurality of flat surfaces in parallel spaced planes, a plurality of stopper means extending perpendicularly from the flat parallel surfaces of said supporting member whereby the axes of said stopper means are parallel, and means for attaching said tape guide members to said supporting member with said tape guide members abutting against said stopper means and said flat parallel surfaces of said tape guide members contacting said flat parallel surfaces of said supporting member whereby said tape guide members are maintained in coaxial alignment and in parallel planes.

3. A tape guide apparatus in accordance with claim 2 wherein the spacing between said flat parallel surfaces of said supporting member determines the gap distance between said tape guide members.

4. A tape guide apparatus in accordance with claim 3 wherein a rotary head is rotatively mounted between adjacent tape guide members.

5. A tape guide apparatus in accordance with claim 4 wherein said head is rotated by a motor, the shaft of the motor being coaxial with the guide members.

References Cited

UNITED STATES PATENTS 3,159,501 12/1964 Maxey ---------- 179—100.2

BERNARD KONICK, *Primary Examiner.*

J. RUSSELL GOUDEAU, *Assistant Examiner.*

U.S. Cl. X.R.

274—4